Patented Sept. 30, 1952

2,612,489

UNITED STATES PATENT OFFICE 2,612,489

PLASTIC COMPOSITIONS COMPRISING BIPHENYLYL ESTERS OF ALIPHATIC ACIDS

Carl B. Havens, Hope, Mich., assignor to The Dow Chemical Company, Midland, Mich., a corporation of Delaware No Drawing. Application March 26, 1951,
Serial No. 217,689

8 Claims. (Cl. 260—45.85)

1

This invention relates to new plastic compositions containing biphenylyl esters of aliphatic acids of from 10 to 18 carbon atoms. The invention relates in particular to new compositions of matter comprising one or more such esters as stabilizing plasticizers in polymeric bodies containing vinyl chloride in substantial amount.

The polymers of vinyl chloride, and many of the copolymers and plasticized compositions thereof, are now well-known in the art. Most of these polymers, copolymers, and compositions can be molded or extruded to form useful, shaped articles. They commonly suffer from the disadvantage of undergoing decomposition when exposed for prolonged periods to the effects of light. Furthermore, it has been found that such products tend to darken after prolonged exposure to elevated temperatures. This darkening is accompanied by a change in other physical properties of the polymeric product and is assumed to be evidence of partial decomposition.

The plastic properties of the above-mentioned polymers and copolymers may be modified considerably by adding certain plasticizing agents either to the polymeric material or to the monomer or mixture of monomers from which it is prepared. Most of the plasticizers are apparently incapable of preventing or of substantially reducing the tendency of these polymers to decompose or to darken when exposed for prolonged periods to the effects of light or heat. These undesirable effects are particularly noticeable when dealing with articles having a thin section, such as is found in films or filaments. Some addition agents have been found to stabilize the polymer and copolymer somewhat against the effects of heat or light. In a few instances the stabilizing agent has, as well, some plasticizing properties. While various protective agents have been proposed, one is still desired which has good plasticizing properties and provides adequate stabilization against the effects of both heat and light.

It is accordingly among the objects of the present invention to provide a vinyl chloride polymer composition which is stable both to ultra-violet light from artificial sources and that contained in direct sunlight, so that the composition may be stable toward any common type of light to which it may be subjected. A further object is to provide a stabilized composition as aforesaid which can be heated to temperatures sufficiently above the softening point of the composition so that the polymer may be readily worked while in a plastic state, without decomposition. A still further object is to provide

2 a heat and light stabilizer in the form of a plasticizer for polyvinyl chloride compositions. A related object is to provide such a composition containing a biphenylyl ester of certain aliphatic acids of from 10 to 18 carbon atoms or a mixture of two or more of these esters, which will afford improved protection against the injurious effects of heat and light.

The biphenylyl esters of unsubstituted straight-chain aliphatic monocarboxylic acids containing from 10 to 18 carbon atoms per molecule have been prepared, and the stated objects may now be attained through the incorporation of said esters in polymeric compositions containing vinyl chloride in substantial amount. The most effective esters of this class appear to be the biphenylyl esters of capric, lauric, palmitic, stearic, oleic, and linoleic acids. Among the other esters which may be employed for the present purpose are the biphenylyl esters of the following acids: undecanoic, tridecanoic, tetradecanoic (myristic), pentadecanoic, heptadecanoic, the 2-, 3-, 4- and 9-decenoic acids, the 9- and 10-undecenoic acids, the 2-, 4-, 5-, 9-, and 11-dodecenoic acids, the 2- and 12- tridecenoic acids, the 4-, 5-, and 9-tetradecenoic acids, the 2- and 14-pentadecenoic acids, the 2-, 7-, and 9-hexadecenoic acids, 2-heptadecenoic acid, the 2-, 3-, 4-, 5-, 6-, 7-, 8-, 10-, 11-, and 12-octadecenoic acids, elaidic acid, 2,4-pentadienoic acid, 2,4-hexadienoic acid (sorbic acid), the geometrical isomers of linoleic acid, 9, 11-octadecadienoic acid, linolenic acid, eleostearic acid, hiragonic acid, moroctic acid, and stearidonic acid.

Mixtures of the above-named esters may be employed effectively as stabilizing modifiers in the compositions of the present invention. Vegetable and animal oils contain the glycerides of various aliphatic acids of from 10 to 18 carbon atoms. The acids obtained from such oils may be esterified with a phenyl phenol to yield the corresponding biphenylyl esters which are most satisfactory as stabilizing modifiers in the compositions of the present invention. Among the various commercial oil fatty acids which may be esterified with phenyl phenol and employed for the present purpose are coconut oil fatty acid, hydrogenated animal oil fatty acids, palm oil fatty acid, animal oil fatty acid, cotton seed oil fatty acid, soyabean oil fatty acid, peanut oil fatty acid, tall oil fatty acids, sunflowerseed oil and linseed oil fatty acid. Some of the oils from which these oil fatty acids may be obtained are listed in the table "Constants of Vegetable and Animal Oils, Fats and Waxes" pages 1318–1319 of the Handbook of Chemistry and Physics, 32nd edition (1950).

The esters employed in the compositions of the present invention may be prepared conveniently by first converting the desired aliphatic acid into its corresponding acid chloride. A mole of phosphorus trichloride is stirred with 3 moles of the aliphatic acid or mixture of acids and the resulting mixture is maintained at about 40° C. for several hours, suitably overnight. A lower layer of phosphorous acid is then separated from the upper layer of crude acid chloride. The latter is subsequently heated to a temperature of about 85° C., preferably under vacuum, thus removing the residual trace of phosphorus trichloride. The crude acid chloride is added slowly to an equimolar amount of phenyl phenol maintained at about 60° C. and under a partial pressure of 10-20 millimeters of mercury (absolute) during the course of about one hour. At the end of this period, the reaction mixture is heated to 125° C. at the same reduced pressure thus completing the esterification. The crude ester product may be washed with a dilute sodium carbonate solution until it exhibits a neutral reaction, and finally with water to remove traces of inorganic salts. The product is then purified by distillation under reduced pressure.

Esters so prepared have been found useful in stabilizing and plasticizing polyvinyl chloride compositions for fabrication into films, filaments, and other articles by hot extrusion or molding operations. They are especially useful in the preparation of odorless, heat and light stable plastic articles.

The amount of the ester to be employed may vary with the type of polymer or copolymer to which it is added and with the conditions against which it is desired to protect the polymeric product. Amounts varying from about 5 per cent by weight up to and including 50 per cent, or other plasticizing quantities of the ester modifier, are employed. Larger amounts than those indicated may, of course, be employed especially when said ester is relied upon to provide an unusually large amount of plasticity. Amounts smaller than 5 per cent may be sufficient in products which require little plasticity and which will not be subject to serious exposure to light or heat. The preferred and most practical amounts of these esters for the protection and modification of these polymers are from 15 to 35 per cent.

Among the polymers or copolymers which have been treated advantageously with the biphenylyl esters of the previously-defined aliphatic acids in accordance with the present invention are polyvinyl chloride and copolymers comprising at least 50 per cent vinyl chloride with lesser proportions of vinylidene chloride, vinyl acetate, and acrylonitrile, or various mixtures thereof.

The heat and light stabilizing esters of the present compositions may be incorporated with the polymer or copolymer by any of several methods, e. g. by grinding the materials in a ball mill or by compounding them on hot rolls in a manner similar to compounding rubber compositions.

Regardless of the means whereby the stabilizing modifiers are incorporated with polymers or copolymers, a marked stabilizing effect is exhibited when the mixture is exposed to heat or light. Thus a film or filament prepared from polymeric vinyl chloride, or a copolymer of vinyl chloride and vinylidene chloride which does not contain a stabilizing agent, may assume a dark brown or black coloration after several days exposure to sunlight or after about one-half hour exposure to a temperature of 150° C. In contrast, analogous articles comprising preferred amounts of the biphenylyl esters may be exposed to sunlight or to more concentrated ultra-violet rays for long periods or to a temperature of 150° C. for several hours without becoming materially discolored.

The following examples illustrate the practice of the invention:

Example 1

Two parts by weight of a commercial grade of polyvinyl chloride in powder form, was compounded with 1 part of one of the biphenylyl esters. For comparison, a blank was similarly compounded from polyvinyl chloride in admixture with tricresyl phosphate, a commonly employed commercial plasticizer, in the same proportions as the new compositions. All of these compositions were heated in an oven at 70° C. for 2 hours. All compositions were then heated at 150° C. for various lengths of time, after being compression-molded for 1 minute at 180° C. into samples of uniform thickness (0.025 inch). The amount of decomposition was judged from the darkening of the various samples. The amount of time required for each sample to attain a dark brown or black coloration was used as an index to the rate of decomposition. Thus, a modifier was rated as being a poor heat stabilizer if its plastic composition turned to a dark brown or black coloration within the first hour of the heat treatment. A heat exposure of 1 hour resulted in a dark brown coloration of the blank sample. The three samples comprising 2-biphenylyl oleate, 2-biphenylyl linoleate, and the lauric acid ester of a commercial mixture of 3- and 4-phenylphenols required 4 hours to form the same dark brown color, showing a thermal stability of four times that of the blank. The four samples comprising 2-biphenylyl caprate, 2-biphenylyl laurate, 2-biphenylyl palmitate, and 2-biphenylyl stearate did not decompose sufficiently to attain the standard dark brown color in more than 8 hours of exposure to the same heat treatment, showing a heat stability of over eight times that of the blank sample.

Example 2

Identical sample moldings of the ester modifiers and the blank were prepared as in Example 1. All samples were exposed to ultra-violet rays for 320 hours in a standard fadeometer at a temperature of about 35° to 40° C. and a relative humidity of about 50 per cent. In all determinations, observations were made on test samples before, during and after exposure, the color change or darkening indicating the degree of deterioration resulting from the treatment. As in Example 1, the effectiveness of each modifier, as a light stabilizer, was evaluated according to the length of time that its plastic composition resisted the formation of the same pre-established standard dark brown coloration. A light exposure of 80 hours resulted in a dark brown coloration of the blank sample. In contrast to this, the 7 samples comprising 2-biphenylyl caprate, 2-biphenylyl laurate, 2-biphenylyl palmitate, 2-biphenylyl stearate, 2-biphenylyl oleate, 2-biphenylyl linoleate and the lauric acid ester of a commercial mixture of 3- and 4-phenylphenols did not deteriorate sufficiently to attain the same dark brown color in more than 320 hours exposure to the same light treatment, showing a light stability of over 4 times that of the blank sample. Of the modifiers tested, 2-biphenylyl linoleate exhibited an exceptional and outstanding light stabilizing effect in polyvinyl chloride compositions, when tested as described above.

*Example 3*

Sample moldings of 2-diphenylyl esters of various commercially-obtained animal and vegetable oil fatty acids were prepared and tested for heat and light stability in the same manner as the samples of Examples 1 and 2. The blanks employed were of the same composition as those used in the previous examples. Those samples containing the 2-biphenylyl esters of coconut oil fatty acid, palm oil fatty acid, soyabean oil fatty acid, vegetable oil fatty acid, and linseed oil fatty acid, required a 2-hour heat exposure to form the same characteristic dark brown color, and were seen to have a thermal stability twice that of the blank. In light exposure tests, other samples of polyvinyl chloride compositions each containing one of the 2-biphenyl esters of coconut oil fatty acid, palm oil fatty acid, animal oil fatty acid, cottonseed oil fatty acid, vegetable oil fatty acid, tall oil fatty acid, and linseed oil fatty acid did not deteriorate sufficiently to attain the same dark brown color in more than 320 hours of light exposure—a time improvement in light stability of over 4 times that of the blank sample. Of the modifiers tested, the 2-biphenylyl esters of cotton seed oil fatty acid, soyabean oil fatty acid and vegetable oil fatty acid exhibited an exceptional and outstanding light stabilizing effect in polyvinyl chloride compositions.

Other tests have indicated that improved stability is obtained in a polyvinyl chloride composition when the amount of the ester modifier is as little as 5 per cent by weight. Usually it is unnecessary to employ more than 35 per cent by weight of these compounds for their stabilizing and plasticizing effect, and in most cases, 15 to 35 per cent is sufficient for the purpose.

The invention is not limited to the use of the particular polymer of the examples but is applicable generally to all polymeric vinyl chloride compositions, comprising at least 50 per cent polyvinyl chloride, which tend to darken when heated or when exposed to ultra-violet radiation, prolonging in each case the useful life of the polymer under exposure to heat or light.

This application is a continuation-in-part of my copending application Serial No. 194,187, filed November 4, 1950 and now abandoned.

I claim:

1. A composition of matter comprising a polymeric product containing at least 50 per cent of vinyl chloride in the polymer molecule, and, as a stabilizing agent therefor, from 5 per cent by weight up to and including plasticizing quantities, of the biphenylyl ester of at least one unsubstituted straight-chain aliphatic monocarboxylic acid containing from 10 to 18 carbon atoms and selected from the class consisting of the alkanoic acids and the alkenoic acids containing from 1 to 4 ethylenic double bonds.

2. The composition as claimed in claim 1 wherein the polymeric product is polyvinyl chloride.

3. The composition as claimed in claim 1 wherein from 15 to 35 per cent of said stabilizing agent is employed.

4. The composition as claimed in claim 3 wherein the polymeric product is polyvinyl chloride and the stabilizing agent consists essentially of 2-biphenylyl laurate.

5. The composition as claimed in Claim 3 wherein the polymeric product is polyvinyl chloride and the stabilizing agent consists essentially of 2-biphenylyl caprate.

6. The composition as claimed in claim 3 wherein the polymeric product is polyvinyl chloride and the stabilizing agent consists essentially of 2-biphenylyl palmitate.

7. The composition as claimed in claim 3 wherein the polymeric product is polyvinyl chloride and the stabilizing agent consists essentially of 2-biphenylyl oleate.

8. The composition as claimed in claim 3 wherein the polymeric product is polyvinyl chloride and the stabilizing agent consists essentially of 2-biphenylyl linoleate.

CARL B. HAVENS.

No references cited.